Feb. 24, 1953 — J. FRYE — 2,629,809

SEALING DEVICE FOR PLASTIC SHEET MATERIAL

Filed Nov. 24, 1947 — 2 SHEETS—SHEET 1

INVENTOR.
Jack Frye

BY
Donald F. McCarthy
ATTORNEY

Feb. 24, 1953    J. FRYE    2,629,809
SEALING DEVICE FOR PLASTIC SHEET MATERIAL
Filed Nov. 24, 1947    2 SHEETS—SHEET 2

INVENTOR.
Jack Frye
BY
Donald F. McCarthy
ATTORNEY

Patented Feb. 24, 1953

2,629,809

UNITED STATES PATENT OFFICE 2,629,809

SEALING DEVICE FOR PLASTIC SHEET MATERIAL

Jack Frye, Sedona, Ariz.

Application November 24, 1947, Serial No. 787,802

7 Claims. (Cl. 219—19)

This invention relates to heat sealing tools, and more particularly to simple household or office tools for effecting a union between two or more layers of sheet or similar material.

Thermoplastic materials of various types, in sheet form, have been widely adopted for wrapping, packaging and protective covering purposes. Such thermoplastic materials as regenerated cellulose, rubber hydrochloride, plasticized polyvinyl chloride, vinyl chloride-vinylidine chloride interpolymers and the like, in sheet form, are widely used in homes, offices, workshops, studios and the like, for the above-noted and similar purposes. In addition to materials of the type exemplified above, such flexible sheet materials as paper or cloth, either coated or impregnated with thermoplastic material, or provided with a bonding layer or strip of such heat-sealable material, applied as a coating at its marginal edges or as a separate strip or layer inserted between the surfaces to be bonded are used extensively for the purposes illustrated above. The thermoplastic or other heat-sealable materials mentioned above find their most common applications in bags for food storage, particularly in deep-freeze units, refrigerators and ice boxes, in garment bags for the protective storage of clothing and other textile materials, particularly woolens, and in protective covers for books, photographs, notebooks and the like.

The use of thermoplastic or other heat-sealable materials exemplified above, for wrapping, covering or packaging purposes frequently involves effecting a union or bond between two or more layers of the thermoplastic material. Thus, in wrapping food for freezing or storing purposes, the food is commonly placed in a bag made of thermoplastic sheet material and the open end of the bag is sealed by placing together and heating the edge portions surrounding the opening. Usually, such seal takes the form of a continuous fused joint or seam which should be gastight and moistureproof. This type of closure is primarily intended to prevent odors originating with the food contained in the bag from escaping into the storage space and contaminating other materials located therein, as well as to preserve the quality of the food stored in the bag by preventing contamination of the bag contents. With garment bags, to refer to another typical example, the edges surrounding the opening through which the garments or other textile materials have been introduced into the bag, are to be sealed primarily in order to prevent moths or dust from entering the bag and attacking or soiling the articles placed therein. While a continuous seam or bond of the type referred to above with reference to food storage bags may be employed also in this instance, a more intermittent type of closure may be considered sufficient for this purpose and in this case, the edges of the material surrounding the opening may be merely tacked at spaced intervals to effect a union of the bonding portions which will satisfy the requirements.

The prior art has proposed a number of devices for sealing thermoplastic wrapping and similar sheet materials, but all the devices heretofore developed were designed for industrial rather than home or office uses and therefore, took the form of bulky and costly equipment. In view of the comparatively limited and intermittent use of devices of this type for household, office and similar purposes, the size, price and space demands of the commercial equipment did not justify its use for other than commercial purposes. Accordingly, the housewife heretofore has been restricted to using an ordinary pressing iron whenever it was necessary or desirable to heat-seal thermoplastic wrapping and similar sheet materials.

It is one of the primary objects of the present invention to fill this gap in the prior art, and to provide heat sealing tools for thermoplastic materials in sheet form, such as food storage or garment bags or the like, which are distinguished by simplicity, low cost and facile operability and which, therefore, are marketable as household utensils or office devices with all the characteristics of simplicity, low price and small space consumption required of articles of this kind.

It is a further object of the invention to provide sealing equipment for thermoplastic sheet and similar materials which are effective in making uniform and homogeneous seams, both of the airtight and moistureproof variety and of a more intermittent, tacking type, the equipment being particularly designed for facilitating intermittent employment for home and office applications, as distinguished from continuous operation on an industrial or commercial scale.

A still further object of the invention is to provide heat sealing equipment for thermoplastic material which may be operated by a housewife or an unskilled operator without danger of injury from contact with electrically energized or moving parts of the operating mechanism.

An ancillary object of the invention is to provide a somewhat more elaborate modification of the basic sealing equipment according to the present invention, for special uses where, as in offices, studios, workshops, etc., there exists a greater demand for more frequent operation of the equipment so as to justify a somewhat more elaborate device and a correspondingly somewhat higher price, without there being a need for a full size machine or other industrial type of equipment.

Other objects, and the manner in which the same are attained, will become apparent as the present specification proceeds.

2,629,809

3

In the drawing affixed to this specification and forming part thereof, several embodiments of the invention are illustrated diagrammatically by way of example, but I wish it to be understood that I do not desire to be limited to the details of construction, design and operation shown and described, as numerous modifications falling within the scope of the appended claims may occur to persons skilled in the art and could be used without departing from the spirit of the invention or sacrificing any advantages thereof.

In the drawings,

Figs. 4 and 5 illustrate, in front and side views, respectively, and partly in section, another modification of the embodiment of the invention shown in Figs. 1 and 2; while

Figure 1:
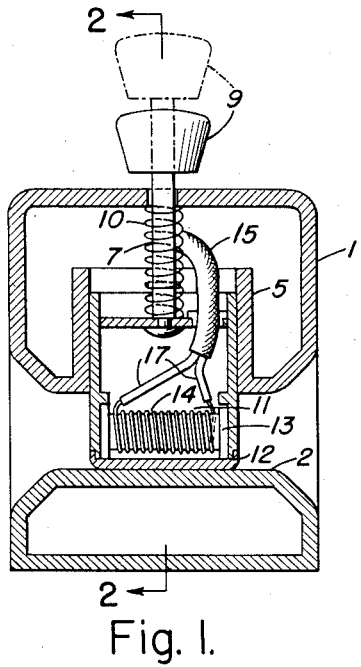
Figs. 1 and 2 are front and side views, respectively, partly in section, of one embodiment of the present invention.
Figure 2:
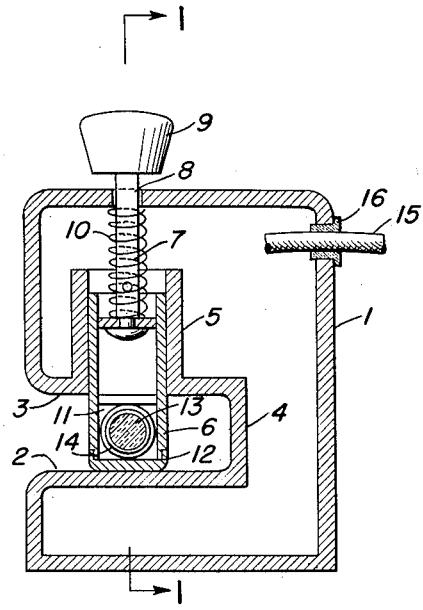

Referring first to Figs. 1 and 2 of the drawings, these show a frame or housing 1. The housing 1 has a reentrant portion extending horizontally which is defined by a bottom 2 (hereinafter referred to as the supporting surface 2), a top 3 and a vertically extending closing or connecting portion 4. Another reentrant portion provided in the top 3 extends vertically and is defined by a wall or sleeve 5 which, in the embodiment illustrated in the drawing, is rectangular, but which may also be of cylindrical or any other desired configuration, this portion being open at the top and bottom to accommodate a plunger 6 which is arranged for sliding vertical displacement within the sleeve 5. As shown in the drawing, the plunger 6 has a somewhat elongated rectangular configuration in order to conform with the configuration of the sleeve 5; if the sleeve 5 is made cylindrical or takes any other desired shape, the plunger 6 is, of course, modified accordingly to match the modified shape of the surrounding sleeve 5. A rod 7 mounted on the top of plunger 6 extends through an opening 8 in the top of housing 1 and carries a knob or other convenient handle 9. A coil spring 10 surrounds the rod 8 and extends between the top of the plunger 6 and the interior confines of the housing 1 so as to ordinarily force the plunger downward, into engagement with the supporting surface 2. The knob 9 serves the purpose of temporarily lifting the plunger 6 against the action of spring 10 so as to disengage the plunger from the support 2, and it is obvious that upon release of the knob 9, the plunger will return into engagement with the support 2 in view of the action of spring 10 as described above.

The plunger 6, in its bottom portion, comprises a compartment 11 which is heat insulated with respect to the remaining portions of the plunger and comprises a bottom portion 12 made of a material with particularly good heat conducting characteristics, such as copper, for example. Mounted in the compartment 11 of plunger 6 is an electrical heating element of a type known in itself, which comprises a support 13 of insulating or nonconductive material, and wound thereon, an electrical resistance heating coil 14 which, although spaced from the heat conductive bottom portion 12 of plunger 6, is arranged in sufficiently close proximity thereto as to provide for optimum heat transfer characteristics from heating coil 14 to plunger bottom 12. An electrical

4 cord 15 connected, through a conventional switch (not shown in the drawings) to an ordinary outlet of electrical current for home use, passes into the housing through an insulator 16 and, via leads 17, supplies electric current to the resistance wire coil 14 of the heating element.

In the operation of the device according to Figs. 1 and 2, the knob 9 is raised into the position shown in dotted lines in Fig. 1, whereby to raise the plunger 6 away from the supporting surface 2. The edges to be sealed of a plastic sheet or similar material are now slid between the support 2 and the bottom 12 of plunger 6. Upon release of the knob 9, the plunger, under the action of spring 10, tends to return to its position shown in the drawing so as to grip the edges to be sealed of the plastic sheet (not shown in the drawing) firmly between the bottom 12 of the plunger 6 and the support 2. Upon energizing of the heating element 14 by electric current supplied through cord 15, the bottom 12 of plunger 6 is heated to an elevated temperature which, by an appropriate choice of the heat characteristics of heating element 14, or in case a variation of these characteristics should be desired, by the provision of a thermostat (not shown in the drawing), will act to soften the material of the plastic sheet edges, to result in a uniform sealing of these edges, the plastic sheet or similar material being manually transported or slid between the support 2 and the plunger bottom 12 so as to expose successive portions of the sheet edges to the influence of heat and pressure and thus form a continuous joint or seam.

Figure 3:
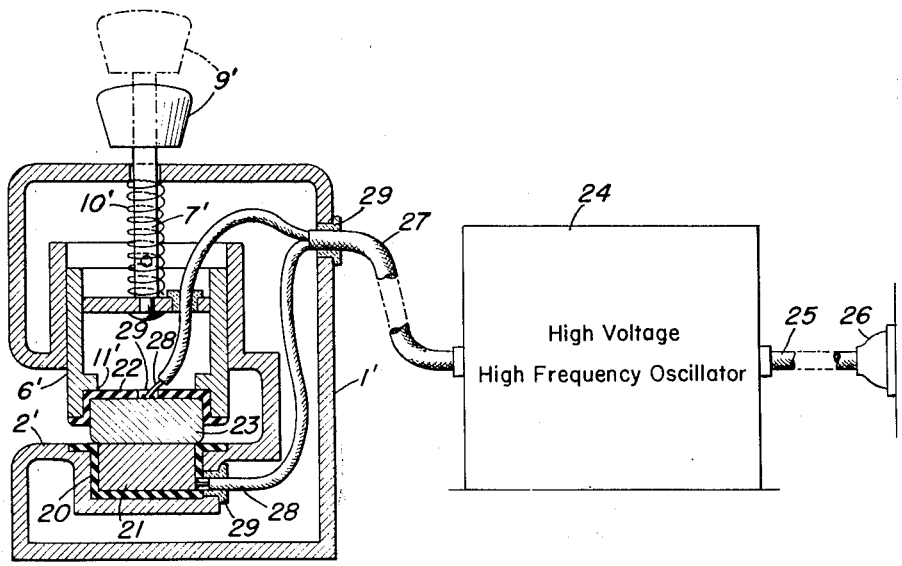
Fig. 3 illustrates in side view, and partly in section, a modification of the embodiment of the invention shown in Figs. 1 and 2.

Referring now to Fig. 3, this device corresponds in many respects to the embodiment of the invention shown in Figs. 1 and 2, corresponding parts being indicated by corresponding, primed reference numerals and the description of this figure being restricted to such parts as are modified by the modification according to Fig. 3. As illustrated in the drawing, the supporting surface 2' is equipped with an insulating portion 20 enclosing an electrode 21, the top of which is flush with the surface of support 2', but is thermally insulated therefrom by means of the insulating portion 20. Similarly, the plunger 6', in its insulated bottom compartment 11', instead of containing the heating element and conductive bottom plate structure of Figs. 1 and 2, comprises an insulating element 22 and mounted therein, a second electrode 23 which ordinarily rests upon its counter part, the electrode 21 provided in base 2'. High-frequency current generated in a high-voltage, high-frequency oscillator system indicated, diagrammatically, by the block diagram 24, which system is supplied with current through a cord 25, a switch (not shown in the drawing) and a plug 26 plugged into a conventional current outlet is supplied to the electrodes 21 and 23, respectively, by cord 27 and leads 28, insulators 29 being provided to take care of the necessary insulation.

The operation of the device according to Fig. 3 is substantially the same as that described with reference to Figs. 1 and 2, the edges to be sealed of the plastic sheet being inserted between the electrodes after raising the plunger 6' by means of the knob 9' sufficiently to permit the plastic material (not shown in the drawing) to be slid between the electrodes 21 and 23, whereupon the knob 9' is released and plunger 6' returns downwardly, so that the material is now firmly gripped between the two electrodes. Upon energizing of the electrodes, the plastic sheet material is manually transported therebetween to effect a perfectly uniform, continuous heat sealing of the sheet edges gripped between the electrodes.

In place of the electrodes 21 and 23, roller-like electrodes may be employed to advantage, the rotation of the rollers facilitating the transport of the plastic sheet edges through the device.

The device according to Fig. 3, while being somewhat more elaborate, complex and costly than the device illustrated in Figs. 1 and 2, may prove advantageous in instances where, as in offices, studios, workshops and the like, an increased demand for sealing operations exists without justifying the expense and space demands of an industrial type of equipment. As is well known in the art, the flow of high frequency between the electrodes and across the plastic sheet edges to be sealed, generates heat by dielectric loss. Instead of heating the edges on the outside, so as to obtain a temperature gradient with the lowest temperature in the center where the sealing should occur, the high frequency causes the highest temperature to be generated in the central region, where it is most desired, so a perfectly uniform bonding of the seam is obtainable.

Figure 4:
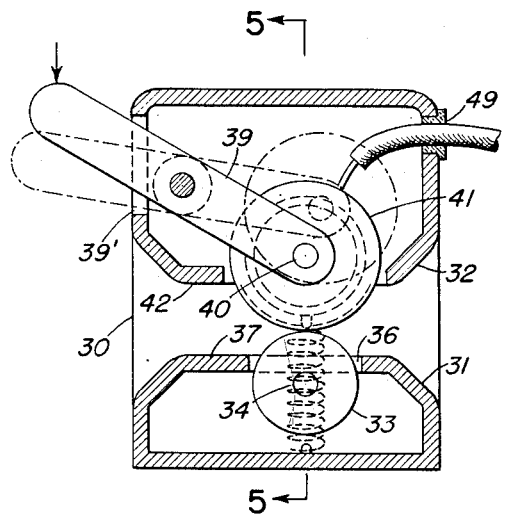
Figure 5:
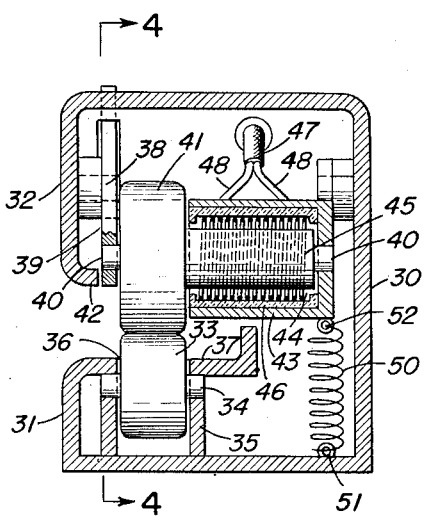

Referring now to Figs. 4 and 5, a housing 30 of somewhat similar configuration as housings 1 and 1', respectively, in Figs. 1, 2 and 3, comprises a reentrant bottom portion 31 and a reentrant top portion 32. An idler disk 33 is journaled in the bottom portion by means of a shaft 34 and brackets 35, the disk 33 projecting through an opening 36 in the top portion 37 of portion 31.

In the top housing portion 32, there is mounted on a pivot 38, a lever 39 one end of which extends through an opening 39', outside the housing 30, while the other end, by means of a shaft 40, mounts a second rotary disk 41 which projects downwardly beyond the bottom 42 of the reentrant portion 32, to ordinarily engage the idler disk 33. The shaft 40 mounting the rotary disk 41 also supports a housing or frame 43 arranged to the side of the rotary disk 41 and containing, in its interior, the base 44 made of insulating or non-conductive material, and the resistance wire coil 45 wound on such base, of a conventional electrical heating element which, to insure against heat losses, may be thermally insulated with respect to the housing or frame 43 by means of an insulating wall 46. Electrical current deriving from an ordinary current outlet (not shown) is passed through an electric cord 47 and a conventional switch (not shown in the drawing) to leads 48 which connect with the resistance wire coil 45, an insulator 49 being provided to electrically insulate the core 47 from the housing 30 where it passes into the same.

A coil spring 50 is secured, with its one end, to a point 51 on the housing 30, while its other end attaches to a point 52 of the housing or frame 43 surrounding the heating element.

In the operation of the device according to Figs. 4 and 5, lever 39 is depressed so the disk 41 is lifted out of engagement with the idler disk 33, the spacing of the two disks permitting the insertion of the edges to be sealed of a plastic sheet or the like (not shown in the drawing). Upon insertion of these edges or marginal portions of the plastic sheet, the lever 39 is disengaged, whereupon the disk 41 tends to return to its original position in view of the action of the coil spring 50. Thus, the disk 41 will come to rest on top of the edges to be sealed of the plastic sheet material which will be firmly gripped between the disks 41 and 33, respectively, the transport of the same between the disks being facilitated by the rotation thereof. Current is supplied to the heater element 45 and the disk 41 is heated to convey sufficient heat to the edges of the plastic sheet material to soften the material for a uniform, homogeneous seam.

While, for sake of simplicity, only one of the rotary disks has been shown to be heated in Figs. 4 and 5, it may be preferable to have both rotary disks provided with heating elements in order to heat both sides of the plastic material simultaneously.

Figure 6:
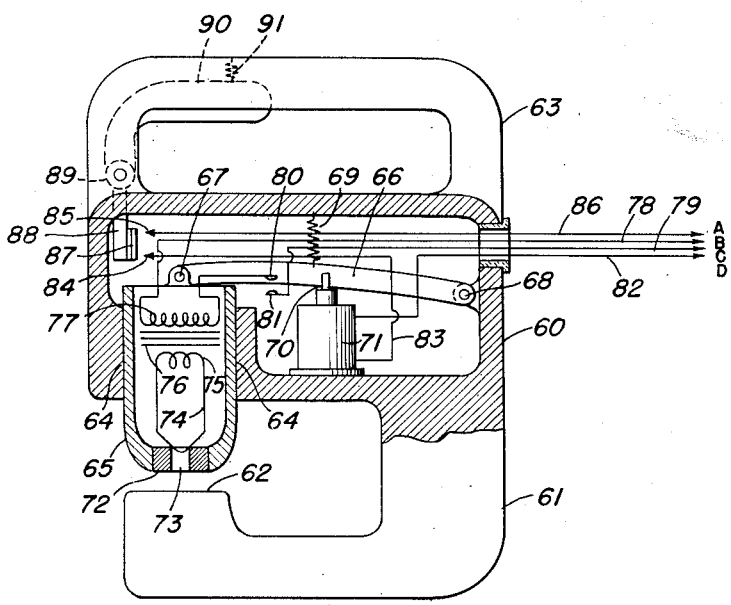
Fig. 6 illustrates in side view, and partly in section, another embodiment of the invention.

Referring to Figs. 6, this illustrates an embodiment of the invention particularly designed for uses where an intermittent, tacking action rather than a continuous seal is desired, its main utility residing in the quick, instantaneous response type of tacking action that may be required for special uses. As shown in the drawing, the device according to Fig. 6 includes a main body or frame portion 60, a bottom portion 61 which terminates in a supporting surface 62, and a top or handle portion 63, all for purposes to be described below. The main body or frame portion 60 includes a reentrant portion 64 which serves as a guide for a plunger member 65 arranged for sliding displacement therein, a lever 66 pivoted to the top of plunger 65 by means of pivot 67, being pivoted by means of pivot 68, to the main housing of frame portion 60 so as to control and limit the stroke of plunger 65. A coil spring 69 is secured, with one end, to lever 66 while the other end is attached to the top of housing portion 60, the spring 69 normally tending to maintain the lever 66 in a raised position so that the plunger 65 is correspondingly spaced from the supporting surface 62. Also attached to the lever 66 is the armature 70 of a solenoid 71 which, when energized, pulls the armature 70, and thus the lever 66, downward, overcoming the force of the coil spring 69, with the result that plunger 65 is forced downward onto any plastic sheet material resting on the supporting surface 62.

The bottom of plunger 65 has embedded in it an insulating portion 72 having both thermal and electrical insulating characteristics and enclosing a tip 73 of a good heat conductor, such as copper, for example. An electrical resistor element 74 extends into contact with the heat conductive tip 73, and this heat resistor element 74 terminates in the secondary winding 75 of a transformer including a core 76 and a primary winding 77. The primary winding 77 is part of an electric circuit including poles B and C of a source of current, leads 78 and 79 and a switch having points 80 and 81 which normally, are spaced from one another but which are arranged to make contact on completion of the downward stroke of plunger 65.

The solenoid is energized through a lead 82 leading to one pole D of a current outlet, and another lead 83 leading to a point 84 of a two-point switch, the other point 85 of which is connected, through a lead 86, to the other pole A of the current source. Contact between the points 84 and 85 of the switch is established by means of a contact portion 87 mounted on a lever arm 88 which is pivoted to the handle portion 63 by means of a pivot 89 and is arranged to engage or disengage switch points 84 and 85 by the raising or lowering of a switch lever handle 90. This lever 90 is integral with the switch contact lever 88 and thus also is pivoted at 89; it is embedded in a suitable depression provided in the handle portion 63 and may be raised against the action of a compression spring 91 secured, with one end, to the switch lever handle 90 and, with the other end, to the handle portion 63 and which normally tends to maintain the switch lever handle 90 in the position shown in Fig. 6, i. e., in a position where the contact portion 87 is spaced from the switch points 84 and 85 so no contact exists.

In the operation of the device according to Fig. 6, the edges or marginal portions of plastic sheet material to be sealed or tacked together are inserted between the supporting surface 62 and the plunger 65, all parts being in the position shown in the drawing. When the switch lever handle 90 is raised against the force of the coil spring 91, an operation facilitated by the grip the operator has on the handle portion 63, the contact portion 87 moves into engagement with the switch points 84 and 85 so as to cause current to flow from pole A through lead 86, point 85, portion 87, point 84, lead 83, solenoid 71, and lead 82 to pole D. The solenoid 71, once energized, pulls downward armature 70 and with it the lever 66 so as to force downward plunger 65. The downward stroke of plunger 65 causes switch point 80 to approach and finally make contact with, the corresponding switch point 81, whereupon another electric circuit is closed which includes pole B, lead 78, the primary winding 77, switch points 80 and 81, lead 79 and pole C. The energizing of the primary winding 77 results in the instantaneous, high current energizing of resistance wire element 74 which, in turn, instantaneously heats up, and maintains heated, the heating tip 73 provided in the bottom of plunger 65. In view of the firm contact of the heating tip 73 with the edges of the plastic sheet material to be sealed, a firm seal is instantaneously made at the point of contact. Upon release of the switch lever handle 90, the handle returns to the position shown in the drawing under the action of spring 91, breaking the contact between points 84 and 85, and interrupting current through the solenoid 71. The spring 69 is now effective in pulling lever 66 upward, with the result that plunger 65 likewise is forced upward, the upward stroke of plunger 65 disengaging contact points 80 and 81 so as to break the circuit including the primary 77, whereupon the heating element 74 is de-energized, and all conditions are restored to those illustrated in the drawing. The practically instantaneous response to electrical impulses of the entire system makes it possible, by rhythmic raising and lowering of switch lever handle 90 accompanied by a corresponding transport of the sheet edges to be sealed between the supporting surface 62 and the plunger 65, to perform either a continuous sealing or, preferably, an intermittent, tacking operation so as to bond the material in the form of either a continuous or intermittent seam.

If desired, the device of Fig. 6 may be modified by heating also the supporting surface 62; this merely requires duplicating in the supporting portion 62 the spot-heating system incorporated in plunger 65.

Variable thermostats and other auxiliary devices may be used in connection with all the embodiments of the invention shown or contemplated, particularly where it is desired to treat a variety of materials which might call for different heating temperatures for the most effective bonding operation.

The simplicity of manufacture and operation, the low cost and small space consumption, and the elimination of any danger to the unskilled operator impart advantages to the sealing tools of the invention which enhance their utility for home and office uses as well as any other applications where use of industrial machinery is prohibited by considerations of cost, space consumption and complex operation.

I claim:

1. A heat sealing device comprising in combination, a housing having upper and lower sections and intermediate said sections a reentrant portion having a top and bottom, a rotary disk support for the material to be sealed in said bottom, said top being provided with a slit, a member mounted in said top and movable in said slit, means in said lower section for normally maintaining said movable member in contact with said rotary support, means attached to said movable member and operable to disengage said movable member from said support, and means for electrically heating said movable member.

2. The device as defined in claim 1 wherein said movable member is a rotary disk.

3. A heat sealing device comprising in combination, a housing having upper and lower sections and intermediate said sections a reentrant portion having a top and a bottom, a rotary disk support for the material to be sealed in said bottom, said top being provided with a slit, a shaft in said top, a rotary disk journalled to said shaft and movable in said slit, means for normally maintaining said rotary disks in engagement, a lever pivoted in said top and having its lower end fastened to said shaft, and movable to disengage said disks, and means for heating said second rotary disk.

4. The device as defined in claim 3 including means for heating said first rotary disk.

5. The device as defined in claim 3 wherein the means for maintaining said disks in contact comprises a spring secured to the lower section of said housing.

6. The device as defined in claim 3 in which the end of the lever opposite that fastened to said shaft extends outside of said housing to permit operation thereof.

7. The device as defined in claim 3 wherein the heating element for the second rotary disk is mounted upon and carried by the shaft to which said disk is journalled.

JACK FRYE.

REFERENCES CITED

The following references are of record in the file of this patent:

UNITED STATES PATENTS

| Number | Name | Date |
| --- | --- | --- |
| 1,097,864 | Knopf et al. | Dec. 26, 1914 |
| 1,171,248 | Reilly | Feb. 8, 1916 |
| 1,628,899 | Murphy | May 17, 1927 |
| 2,231,132 | Lovett | Feb. 11, 1941 |
| 2,241,711 | Lowey | May 13, 1941 |
| 2,343,117 | Vincent | Feb. 29, 1944 |
| 2,343,975 | Hosfield | Mar. 14, 1944 |
| 2,395,387 | Fry et al. | Feb. 26, 1946 |
| 2,401,991 | Walton et al. | June 11, 1946 |
| 2,424,558 | Delano | July 29, 1947 |
| 2,426,767 | Dupont | Sept. 2, 1947 |
| 2,438,498 | Geist, Sr., et al. | Mar. 30, 1948 |
| 2,468,263 | Joy | Apr. 26, 1949 |